United States Patent [19]

Lane et al.

[11] Patent Number: 4,497,852
[45] Date of Patent: Feb. 5, 1985

[54] MARINE ANTI-FOULING COATING COMPOSITION

[76] Inventors: Thomas A. Lane, 314 Foggy Ridge Pkwy., Lutz, Fla. 33549; Murray Rosen, 10000 W. Bay St., Seminole, Fla. 33542; Maxie E. Quinn, 1933 W. Arvis Cir., Clearwater, Fla. 33516

[21] Appl. No.: 439,017

[22] Filed: Nov. 3, 1982

[51] Int. Cl.$^3$ .............................................. B05D 5/00
[52] U.S. Cl. .................................. 427/287; 106/18.32; 523/122; 524/356; 525/125; 525/127; 525/131; 525/201
[58] Field of Search ...................... 427/287; 106/18.32; 523/122; 524/356; 525/201, 125, 127, 131

[56] References Cited

U.S. PATENT DOCUMENTS

| 3,167,473 | 1/1965 | Leebrick | 106/18.32 |
|---|---|---|---|
| 3,595,817 | 7/1971 | Deinet | 106/18.32 |
| 3,990,381 | 11/1976 | Shepherd et al. | 427/287 |
| 4,082,709 | 4/1978 | Dyckman et al. | 523/122 |
| 4,082,884 | 4/1978 | DeLong | 523/122 |
| 4,263,424 | 4/1981 | Buckley et al. | 523/122 |
| 4,271,058 | 6/1981 | Trabitzsch | 523/122 |
| 4,273,833 | 6/1981 | DeLong | 106/18.32 |
| 4,329,277 | 5/1982 | Murphy | 523/122 |

*Primary Examiner*—Norman Morgenstern
*Assistant Examiner*—Janyce A. Bell

[57] ABSTRACT

A non-leaching coating composition useful in preventing fouling of marine structures submerged in water which composition is prepared as a single component composition by comingling a polyol reactive organic polyisocyanate, a hydroxy functional acylic polymer, and an organotin polymer in the presence of a reactivity suppressant solvent medium comprising a mixture of low molecular weight ketones and hydroxy-functional ether or low molecular weight aliphatic alcohol compounds.

20 Claims, No Drawings ly in multiple coats; all have unacceptable abrasion
MARINE ANTI-FOULING COATING COMPOSITION This invention relates to a method and composition for preventing fouling of marine structures submerged in water containing fouling organisms. It specifically relates to a marine paint prepared as a single component composition.

BACKGROUND OF THE INVENTION

The fouling of marine structures by organisms in sea water has been a major problem for virtually centuries. These structures, such as ship hulls, buoys, and pilings, are fouled by the viscous bio-organic products and absorbed organic matter from microorganisms present in the water. Fouling of the structures occurs both in sea water and fresh water. It also occurs in industrial water systems such as cooling systems.

The initial organisms in this fouling process are bacteria present in the aqueous environment followed by biotic progression of diatoms, hydrids, algea, bryozoans, and macrofoulants. The obvious result of this biological activity is the production of a tenacious, opaque slime which forms on the submerged surfaces. Macrofoulants, such as barnacles, form preferentially on roughened surfaces.

Fouling of marine structures is a problem of major proportions. For example, fouling of a boat hull significantly reduces its speed and increases its fuel consumption. Buoys can shift position or become less detectable due to the excessive weight of fouling organisms.

Industrial water systems are plaqued by fouling problems associated with marine growth. The water side of heat exchangers are adversely affected by fouling organisms such that flow rates are lessened and heat transfer efficiency seriously decreased. The fouling of piping in water-intake systems for water cooled marine engines is well known. In such cases, cooling ability is adversely affected, valve damage results, and water pumps are corroded. Corrosion rates of associated piping is accelerated by the presence of these fouling organisms.

Perhaps the most popular method of preventing fouling of marine structures has been the use of copper cladding, and, in some cases, poisonous paints. An asphalt coating has been used effectively. Also, coatings containing organometallic salts, such as tri-n-butyl tin oxide, are extremely effective in killing these organisms. The U.S. Navy apparently has found that coatings containing copper salts and oxides, e.g. cuprous oxide, are effective anti-fouling coatings. More recently, the use of polymeric organotin compounds in coating compositions or paints has received widespread attention.

However, it has been found that all of these prior efforts have serious commercial drawbacks. Most of these prior coating compositions are susceptible to leaching, either intentionally for effective growth control, or inadvertently due to solubility factors. In either case, the leaching phenomenon causes a serious pollution problem for the surrounding waters.

One of the more promising prior coating compositions has been polymeric compounds containing organotin ingredients. For example see Leebrick, U.S. Pat. No. 3,167,473, Goto, et al, U.S. Pat. No. 3,684,752, Dyckman, et al, U.S. Pat. Nos. 3,979,354 and 4,082,709. However, none of these prior efforts have met with commercial success. All of these coating compositions are deficient by exhibiting very poor adhesion characteristics to the submerged marine structure; all exhibit unacceptable softness of the film, particularly when applied in multiple coats; all have unacceptable abrasion resistance against moving water; and all result in unacceptable leaching rates, e.g., are short lived and/or are pollutants.

Therefore, it would be desirable to provide a new and improved marine anti-fouling coating composition which has a smooth hard surface, which is non-leaching, and which is cost effective for commercial production and application.

SUMMARY OF THE INVENTION

Accordingly, it is an object of this invention to provide a new and improved composition of matter which is useful in preventing fouling of marine structures submerged in water containing fouling organisms.

It is also an object of this invention to provide an improved method or process for protecting marine structures from fouling organisms for an extended period of time.

Another object of this invention is to provide an anti-fouling paint which is hydrophobic, optically clear, and non-leaching for application to marine structures.

Still another object of this invention is to prepare an anti-fouling coating composition as a single component medium.

A still further object of this invention is to provide a method of preparing an anti-fouling coating composition as a single component medium in a cost effective manner.

These and other objects of this invention are accomplished by providing a non-leaching coating composition useful in preventing fouling of marine structures submerged in water which composition is prepared as a single component composition by comingling a polyol reactive polyisocyanate, a hydroxy functional acrylic polymer, and an organotin polymer in the presence of a medium comprising a mixture of low molecular weight ketones and hydroxy functional ether or linear alcohol compounds.

DESCRIPTION OF THE PREFERRED EMBODIMENTS

According to the present invention a new composition of matter is provided which in one embodiment is a single component coating composition having optically clear film characteristics for preventing growth of fouling organisms on marine structures which composition is prepared by the method which comprises: (a) comingling (i) a hydroxy-functional acrylic polymer selected from the group consisting of, polyacrylates, and polymethacrylates, (ii) an organotin polymer, said organotin polymer being a biologically active compound $R_3SnOOCR'$, wherein R is a radical selected from the group consisting of lower alkyl, phenyl, and benzyl radicals and R' is a polymerizable group, selected from the group consisting of vinyl, α-methylvinyl, and vinylphenyl radicals, and (iii) a polyol reactive polyisocyanate, (b) in the presence of a medium comprising a mixture of low molecular weight ketones and hydroxy-functional organic compounds selected from the group consisting of hydroxy ethers and linear alcohols.

Another embodiment of this invention provides a single component coating composition for preventing growth of fouling organisms on marine structures which composition is prepared by the method which comprises (a) obtaining a first solution comprising a mixture of low molecular weight ketones and hydroxy functional organic compounds selected from the group consisting of hydroxy ethers and linear alcohols; (b) admixing the first solution with a hydroxy-functional acrylic polymer selected from the group consisting of polyesters, polyacrylates, and polymethacrylates, to form a second solution; (c) adding to the second solution an organotin polymer, said organotin polymer being a biologically active compound $R_3SnOOCR'$ is a polymerizable group selected from the group consisting of vinyl, α-methylvinyl, and vinylphenyl radicals to form a third solution; and (d) adding to the third solution a polyol reactive polyisocyanate, to form a fourth solution as the single component coating composition.

A specific and preferred embodiment of this invention provides a single component coating composition having optically clear film characteristics for preventing growth of fouling organisms on marine structures which composition is prepared by the method which comprises comingling (i) poly (2-hydroxy ethyl methacrylate); (ii) poly (tri-n-butyltin methacrylate); and (iii) poly (hexamethylene diisocyanate); in the presence of a medium comprising methy ethyl ketone, cyclohexanone, ethylene glycol ethyl ether acetate, isopropyl alcohol, and ethylene glycol monoethyl ether.

Another embodiment of the present invention provides a process of protecting marine structures against the growth of fouling organisms which comprises treating said structures with a hydrophobic polymeric film which is prepared as a single component composition by comingling (i) a hydroxy-functional acrylic polymer selected from the group consisting of polyacrylates, and polymethacrylates, (ii) an organotin polymer, said organotin polymer being a biologically active compound $R_3SnOOCR'$, wherein R is a radical selected from the group consisting of lower alkyl, phenyl, and benzyl radicals and R' is a polymerizable group, selected from the group consisting of vinyl, α-methylvinyl, and vinylphenyl radicals, and (iii) a polyol reactive polyisocyanate, in the presence of a medium comprising a mixture of low molecular weight ketones and hydroxy-functional organic compounds selected from the group consisting of hydroxy ethers and linear alcohols.

A still further object of this invention provides a process of protecting marine structures against the growth of fouling organisms which comprises treating said structures with a hydrophobic polymeric film which is prepared as a single component composition by comingling (i) poly(2-hydroxy ethyl methacrylate); (ii) poly(tri-n-butyltin methacrylate); and (iii) poly(hexamethylene diisocyanate); in the presence of a medium comprising methy ethyl ketone, cyclohexanone, ethylene glycol ethyl ether acetate, isopropyl alcohol, and ethylene glycol monoethyl ether.

A further specific embodiment of the present invention provides the method of protecting a boat hull against fouling by organisms present in the surrounding water which comprises painting at least that portion of the boat hull below the water line with a paint which is prepared as a single component composition by comingling (i) a hydroxy-functional acrylic polymer selected from the group consisting of polyacrylates, and polymethacrylates, (ii) an organotin polymer, said organotin polymer being a biologically active compound $R_3SnOOCR'$, wherein R is a radical selected from the group consisting of lower alkyl, phenyl, and benzyl radicals and R' is a polymerizable group, selected from the group consisting of vinyl, α-methylvinyl, and vinylphenyl radicals, and (iii) a polyol reactive polyisocyanate, in the presence of a medium comprising a mixture of low molecular weight ketones and hydroxy-functional organic compounds selected from the group consisting of hydroxy ethers and linear alcohols.

The new coating composition of the present invention utilizes a novel method to prepare such composition as a single component system. As used in this invention the term "single component" is meant to mean that all active ingredients, i.e. reactants and co-reactants, and all desired formulation aids, such as modifiers, stabilizers, catalysts, fillers, diluents, solvents, curing agents, flow aids, etc., are contained in the final composition. For example, a particularly useful flow aid is cellulose acetate butyrate which can be incorporated as part of the medium or solvent mixture or can be added at any point in the processing procedure. No additional components are needed to create a product for use as herein described. In short, practice of this invention does not require a two-step, or multiple step, application or blending technique to prepare a product for use in coating marine structures. The new coating composition has been found to have virtually an indefinite shelf or pot life prior to use, e.g., a shelf or pot life of from 2–5 years is the expected norm.

The hydroxy-functional acrylic polymer used in this invention can be prepared by techniques well known to those skilled in the art. Basically, it is a ROH reactant which is any polyol or hydroxy-functional polymer. The R group can be a polyester, acrylic or any radical that terminates with an —OH or functional hydroxyl group. These acrylic polymers include homopolymers and copolymers of acrylic and methacrylic monomers as vinyl polymers. The, polyacrylates, and polymethacrylates are particularly suitable. Examples of acrylic polymers for use in this invention include 2-hydroxy ethyl methacrylate, hydroxy propyl methacrylate, glycidyl methacrylate, and the like.

The organotin polymer used in this invention can be prepared by techniques well known to those skilled in the art. Of particular interest and usefulness are those organotin polymers described by Dyckman, et al, in U.S. Pat. No. 3,979,354. Those organotin compounds have the general formula $R_3SnOOCR'$ wherein R' may be selected from the group consisting of vinyl, α-methylvinyl, and vinylphenyl radicals and R is selected from the group consisting of lower alkyl, phenyl, and benzyl radicals.

The radical R' may be a vinyl radical, and the compound $R_3SnOOCR'$ may be a triorganotin ester of acrylic acid, i.e. a triorganotin acrylate. Typical triorganotin acrylates suitable for use in this invention may include tri-n-butyltin acrylate, tri-n-propyltin acrylate, tri-iso-propyltin acrylate, tri-sec-butyltin acrylate, triethyltin acrylate, tribenzyltin acrylate, diethylbutyltin acrylate, diethylamyltin acrylate, diamylmethyltin acrylate, triphenyltin acrylate, diethylhexyltin acrylate, propylbutylamyltin acrylate, tritolyltin acrylate, tribromophenyltin acrylate, diphenyltolyltin acrylate, tri(p-ethylphenyl) tin acrylate, diethylphenyltin acrylate, ethyldiphenyltin acrylate, n-octyldiphenyltin acrylate, diethyl-p-bromophenyltin acrylate, diethyloctyltin acrylate, etc.

According to certain other aspects of this invention the radical R' may be an α-methylvinyl radical, and $R_3SnOOCR'$ may be a triorganotin ester of methacrylic acid, i.e. a triorganotin methacrylate. Typical triorganotin methacrylates suitable for use in this invention may include tri-n-methacrylate, tri-n-propyltin methacrylate, tri-isopropyltin methacrylate, tri-sec-butyltin methacrylate, triethyltin methacrylate, diethylbutyltin methacrylate, diethylamyltin methacrylate, diamylmethyltin methacrylate, propylbutylamyltin methacrylate, diethylhexyltin methacrylate, triphenyltin methacrylate, tritolyltin methacrylate, tribromophenyltin methacrylate, diphenyltolyltin methacrylate, tri(p-ethylphenyl)tin methacrylate, diethylphenyltin methacrylate, ethyldiphenyltin methacrylate, n-octyldiphenyltin methacrylate, diethyl-p-bromophenyltin methacrylate, diethyloctyltin methacrylate, etc.

According to certain other aspects of this invention, the radical R' may be a vinylphenyl radical, and $R_3SnOOCR'$ may be a triorganotin ester of vinylbenzoic acid, i.e. a triorganotin vinylbenzoate. Typical triorganotin vinylbenzoates include tri-n-butyltin p-vinylbenzoate, tri-n-propyltin p-vinylbenzoate, tri-isopropyltin p-vinylbenzoate, tri-sec-butyltin n-vinylbenzoate, triethyltin o-vinylbenzoate, diethylbutyltin p-vinylbenzoate, diethylamyltin m-vinylbenzoate, diamylmethyltin p-vinylbenzoate, propylbutylamyltin p-vinylbenzoate, diethylhexyltin o-vinylbenzoate, triphenyltin p-vinylbenzoate, tritolyltin p-vinylbenzoate, tribromophenyltin p-vinylbenzoate, diphenyltolyltin p-vinylbenzoate, tri(p-ethylphenyl)tin p-vinylbenzoate, diethylphenyltin p-vinylbenzoate, ethyldiphenyltin p-vinylbenzoate, n-octyldiphenyltin p-vinylbenzoate, diethyl-p-bromophenyltin p-vinylbenzoate, diethyloctyltin p-vinylbenzoate, etc.

The preferred $R_3SnOOCR'$ compounds include tri-n-butyltin p-vinylbenzoate, tri-n-butyltin methacrylate, tri-n-propyltin methacrylate, triphenyltin methacrylate, and tri-n-propyltin p-vinylbenzoate.

The monomeric compounds may be available or they may, if desired, be readily synthesized in the laboratory by any of the known techniques for preparing organotin esters. For example, they may be synthesized by the reaction of e.g. triphenyltin hydroxide with methacrylic acid. This may be effected for example by reaction of these materials in solvent, e.g. benzene, by heating the reaction mixture to azeotropically distill the by-product water. The desired product, commonly recovered by evaporating the solvent, may be readily obtained in substantially pure form in high yield.

It may also be possible to employ copolymers of two or more of the $R_3SnOOCR'$ compounds. Typically, these copolymers may include tri-n-propyltin methacrylate-tri-n-butyltin methacrylate copolymers, tri-n-butyltin acrylate-triphenyltin acrylate copolymers, tri-n-butyltin p-vinylbenzoate-tri-isopropyltin p-vinylbenzoate copolymers, etc.

These biologically active polymers may be prepared by various techniques of free radical polymerization. Thus, the polymerizations may be carried out in bulk, in solution, in emulsion, in suspension, etc. Polymerization may be initiated by various suitable free radical initiators including benzolyl peroxide, di-t-butyl peroxide, lauroyl peroxide, eumene hydroperoxide, azo-bis-isobutyronitrile, methyl ethyl ketone peroxide, persulfate-bisulfite redox catalysts, persulfate-mercaptan redox catalysts and the like. The polymerizations may be carried out at any suitable temperature, depending uypon the catalyst system employed, but temperatures in the range of 40°–90° F. are preferred. Polymerization temperatures in this range afford a good balance among rate of polymerization, yield of polymer, molecular weight of polymer and time of reaction. Various polymerization control agents such as accelerators, chain-transfer agents, surface active agents, suspending agents, and the like may also be employed if desired. A specifically preferred organotin compound is poly(tri-n-butyltin-methacrylate).

The polyol reactive polyisocyanate used in this invention can be prepared by techniques well known to those skilled in the art. Basically, the isocyanate polymer is any such compound having the —NCO group capable of reacting with polyols. Suitable examples of polyisocyanates useful in the practice of this invention include hexamethylene diisocyanate, aromatic mono isocyanates, arylisocyanates, phenyl isocyanates. A specifically preferred polyisocyanate is the reaction product of hexamethylene diisocyanate and water, e.g., poly(hexamethylene diisocyanate).

The ability to comingle the hydroxy-functional acrylic polymer, the organotin polymer, and the polyol reactive polyisocyanate in a single step procedure is made possible according to this invention by performing such comingling in the presence of a novel solvent medium comprising a mixture of low molecular weight ketones and hydroxy-functional organic compounds selected from the group consisting of hydroxy ethers and linear alcohols. A particular preferred medium comprises methyl ethyl ketone, cyclohexanone, ethylene glycol ethyl ether acetate, isopropyl alcohol, and ethylene glycol mono ethyl ether. It is an essential part of this invention that the medium contain the hydroxy ether or the linear alcohol, and, preferably, both the hydroxy ether and the linear alcohol. The presence of this novel solvent medium acts as an inhibition to further reaction of the active ingredients until such time as the solvent evaporates from the applied coats leaving a biologically active, non-leaching, optically clear film which prevents fouling of marine structures by organisms present in the surrounding aqueous environment.

The ketone component of the solvent mixture may be prepared by methods well known to those skilled in the art. Typical examples include (singly or in combination with one or more of each) acetone, methyl ethyl ketone, methyl-n-propyl ketone, ethyl ketone, methyl isopropyl ketone, benzl methyl ketone, acetophenone, n-butprophenone, hexanone/benzophenone, 3-hexanone, cyclohexanone, ethylene glycol monoethyl ether acetate. The preferred ketone components of the solvent mixture comprises methyl ethyl ketone, cyclohexanone, and ethylene glycol monoethyl ether acetate.

The hydroxy ether component of the solvent mixture may be prepared by methods well known to those skilled in the art. The hydroxy alkyl ethers such as the ethylene glycol ethers, e.g. the monoalkyl ethers, are particularly suitable for use in the solvent mixture. Typically the alkyl groups will have from 1 to 5 carbon atoms. Examples include ethylene glycol methyl ether, ethylene glycol ethyl ether, ethylene glycol isopropyl ether, ethylene glycol n-propyl ether, ethylene glycol isobutyl ether, ethylene glycol n-butyl ether, and ethylene glycol isoamyl ether. The preferred hydroxyether component of the solvent mixture is ethylene glycol ethyl ether.

The linear alcohol component of the solvent mixture may be prepared by methods well known to those skilled in the art. These alcohols have the general formula ROH where R is any alkyl or substituted alkyl group. Typically, the alkyl groups will have from 1 to 6 carbon atoms and include primary, secondary, and tertiary alcohols. Examples include methyl alcohol, ethyl alcohol, n-propyl alcohol, isopropyl alcohol, n-butyl alcohol, isobutyl alcohol, n-pentyl alcohol.

According to this invention, the particular composition employed in producing the novel coating composition may be chosen with the material treated, the organism to be excluded, and the degree of protection desired against attack by such organism. Generally, the single component coating composition comprises (by weight of the total composition) 5% to 15% hydroxy functional acrylic polymer, 40% to 60% organotin polymer, 2% to 5% polyol reactive isocyanate, and 25% to 45% medium or solvent mixture.

The medium or solvent mixture component of the new coating composition may be chosen according to the desires of the formulator except that the presence of either the hydroxy either or linear alcohol or both are essential to achieve the benefits of this invention. Generally, the solvent mixture comprises from 50% to 85% by weight of the solvent mixture low molecular weight ketones and from 15% to 50% by weight of the solvent mixture hydroxy ethers and/or linear alcohols. A preferred medium comprises a mixture of low molecular weight ketones, an hydroxy ether, and a linear alcohol. An example of the preferred solvent mixture of this invention is (by weight of total medium) 30% to 50% methyl ethyl ketone, 15% to 30% cyclohexanone, 15% to 30% ethylene glycol ether acetate, 5% to 15% isopropyl alcohol, and 5% to 15% ethylene glycol monoethyl ether. A specific example of the preferred medium is (by weight of the total medium) 40% methyl ethyl ketone, 20% cyclohexanone, 20% ethylene glycol monoethyl ether acetate, 10% isopropyl alcohol, and 10% ethylene glycol monoethyl ether. In addition, from 0.5% to 3% by weight of the total composition cellulose acetate butyrate may be added as a flow aid.

The comingling of all components of the present invention may be performed in any suitably sized container such as a stainless steel paint mixing vat. Each component may be pumped into the vat via any pumping means but in all cases the medium or solvent mixture must be present before the polyol reactive isocyanate is comingled with the organotin polymer and hydroxy functional acrylic polymer.

The temperature in the mixing vat may be any moderate temperature but it has been found that a temperature between 60° F. and 105° F., preferably from 70° F. to 90° F., is suitable. Essentially atmosphere pressure is maintained within the mixing vat.

Marine structures, particularly boat hulls, treated with the coating composition of this invention may be rendered resistant to attack by bacteria, fungi, mildew, mold, marine organisms, etc. It has been found that these new coating compositions are non-leaching. For example, test panels painted with the specifically preferred coating composition to a thickness of 11 mils showed no decrease in film thickness after exposure for fifteen months in a sea water environment. Physical characteristics of the specifically preferred composition were as follows:

| | |
|---|---|
| Solids (by weight) | 35% |
| Density | 8.05 pounds/gallon |
| Color | clear |
| Viscosity (Zahn #2 cup) | 35 sels |
| Set Time | ½ hour |
| Tape Time | 4 hours |
| Tack Free Time | 4 hours |

-continued

| | |
|---|---|
| Hardness (KHN) | 4-5 hours |
| Flash Point (TCC) | 24° F. |

The above material was optically clear and was suitable for coating marine structures with essentially no pollution. The non-leaching property of the applied film provides a life expectancy exceeding three years, e.g. five years or more, depending on the effect of erosion of the film through use on the structure.

EXAMPLE

The following components in amounts sufficient to produce 25 gallons of paint were comingled in a stainless steel mixing vessel equipped with stirring or agitation means in varying amounts as shown in Table 1 below:

poly(2-hydroxy methyl methacrylate)—obtained in liquid form as Acryloid ®AU-608 from the Rohm and Haas Company poly(tri-n-butyltin methacrylate)—obtained in liquid form as bioMet ®302 from M&T Chemicals, Inc.

poly(hexamethylene diisocyanate)—obtained in liquid form as Desmodur N-75 from Mobay Chemical Corporation

| | Blends (% by weight*) | | | |
|---|---|---|---|---|
| Component | A | B | C | D |
| poly (2-hydroxy methyl methacrylate) | 10.75 | 10.75 | 10.75 | 10.75 |
| poly (tri-n-butyltin methacrylate) | 52.27 | 52.27 | 52.25 | 52.25 |
| poly (hexamethylene diisocyanate) | 3.01 | 3.01 | 3.01 | 3.01 |
| methyl ethyl ketone | 13.59 | 13.59 | 13.59 | 16.99 |
| cyclohexanone | 6.79 | 6.79 | 6.79 | 8.49 |
| ethylene glycol ether acetate | 6.79 | 6.79 | 6.79 | 8.49 |
| isopropyl alcohol | 3.40 | 6.80 | 0 | 0 |
| ethylene glycol ethyl ether | 3.40 | 0 | 6.80 | 0 |
| | 100.00 | 100.00 | 100.00 | 100.00 |

*For application by paint brush 1.58% of the total composition weight cellulose butyrate acetate was added as a flow aid.

Stirring of the entire mixture was maintained for 30 minutes (except for Sample D which could not be stirred after it gelled) at a temperature of from 70° F. to 90° F. The comingling of these components for Samples A, B, and C was performed without incident and in each case the resultant single component composition was an optically clear liquid (with a pot life exceeding twelve months) and upon application of each to a marine structure test panel produced a hard film which successfully resisted organism fouling when immersed in sea water over an extended period of time. Sample A has no visible signs of fouling after twenty-four months of immersion in sea water taken from the Tampa, Fla., area. A test panel with no coating became badly fouled by the same source of sea water within three weeks. Similar results would be expected from fresh water which contained fouling organisms. Sample D immediately set up as a solid gel which could not be applied to any structure, i.e., from a practical standpoint it has "zero" pot or shelf life.

As many embodiments, modifications and variations of the present invention may be made in view of the above teachings without departing from the spirit of the invention, it will be understood that, within the scope of the appended claims, the invention may be practiced otherwise than as specifically described.

We claim:

1. A single component coating composition having optically clear film characteristics particularly suitable for preventing growth of fouling organisms on marine structures, said composition comprising:
   a hydroxy functional acrylic polymer;
   a biologically active organotin polymer of the formula $R_3Sn-OOCR'$ wherein R is selected from the group consisting of lower alkyl, phenyl and benzyl and R' is a polymerizable radical selected from the group consisting of vinyl, methyl vinyl and vinylphenyl;
   a polyol reactive polyisocyanate; and
   a reaction inhibiting solvent medium comprising a mixture of at least one low molecular weight ketone and a co-solvent selected from the group consisting of hydroxyethers, linear alcohols and isopropyl alcohol.

2. A single component coating composition according to claim 1 wherein said polyol reactive polyisocyanate is the reaction product of hexamethylene diisocyanate and water.

3. A single component coating composition according to claim 1 wherein said acrylic polymer is selected from the group consisting of hydroxy ethyl methacrylate and hydroxy propyl methacrylate.

4. A single component coating composition for preventing growth of fouling organisms on marine structures, said composition prepared by the method which comprises:
   (a) obtaining a first solution comprising a mixture of low molecular weight ketones and hydroxy functional organic compounds selected from hydroxy ethers, linear alcohols and isopropyl alcohol;
   (b) admixing said first solution with a hydroxy functional acrylic polymer selected from the group consisting of polyacrylates, polymethacrylates and copolymers thereof with at least one additional copolymerizable monomer, to form a second solution;
   (c) adding to said second solution an organotin polymer being a biologically active compound of the formula $R_3Sn-OOCR'$ wherein R is selected from the group consisting of lower alkyl, phenyl and benzyl and R' is a polymerizable radical selected from the group consisting of vinyl, methyl vinyl and vinylphenyl to form a third solution; and
   (d) adding to said third solution a polyol reactive polyisocyanate to form a fourth solution as said single component coating composition.

5. A single component coating composition according to claim 4 wherein said polyol reactive polyisocyanate is the reaction product of hexamethylene diisocyanate and water.

6. A single component coating composition according to claim 4 wherein said medium comprises a mixture of low molecular weight ketones, an hydroxy ether and a linear alcohol.

7. A single component coating composition according to claim 5 wherein said acrylic polymer is selected from the group consisting of hydroxy ethyl methacrylate and hydroxy propyl methacrylate.

8. A single component coating composition having optically clear film characteristics for preventing growth of fouling organisms on marine structures prepared by the method which comprises:
   (a) comingling
      (i) poly(2-hydroxy ethyl methacrylate),
      (ii) poly(tri-n-buyltin methacrylate), and
      (iii) poly(hexamethylene diisocyanate),
   (b) in the presence of a medium comprising methyl ethyl ketone, cyclohexanone, ethylene glycol ethyl ether acetate, isopropyl alcohol, and ethylene glycol mono ethyl ether.

9. A single component coating composition according to claim 8 wherein said medium additionally contains cellulose acetate butyrate.

10. A single component coating composition according to claim 8 wherein said poly(2-hydroxy ethyl methacrylate) comprises from 5% to 15% by weight, said poly(tri-n-butyltin methacrylate) comprises from 40% to 60% by weight, said poly(hexamethylene diisocyanate) comprises 2% to 5% by weight, and said medium comprises 25% to 45% by weight.

11. A single component coating composition according to claim 10 wherein said medium additionally contains from 0.5% to 3% by weight cellulose acetate butyrate.

12. The process of protecting marine structures against the growth of fouling organisms which comprises treating said structures with a hydrophobic polymeric film, said film produced by removal of solvent from a single component composition produced by comingling
    a hydroxy functional acrylic polymer;
    a biologically active organotin polymer of the formula $R_3Sn-OOCR'$ wherein R is selected from the group consisting of lower alkyl, phenyl and benzyl and R' is a polymerizable radical selected from the group consisting of vinyl, methylvinyl and vinylphenyl;
    a polyol reactive polyisocyanate; and
    a reaction inhibiting solvent medium comprising a mixture of at least one low molecular weight ketone and a co-solvent selected from the group consisting of hydroxyethers, linear alcohols and isopropyl alcohol.

13. The process of protecting marine structures against the growth of fouling organisms which comprises treating said structures with a hydrophobic polymeric film, said film produced by the removal of solvent from a single component composition produced by comingling
    poly(2-hydroxyethyl methacrylate);
    poly(tri-n-butyltin methacrylate); and
    poly(hexamethylene diisocyanate)
    in the presence of a reaction inhibiting solvent medium comprising methyl ethyl ketone, cyclohexanone, ethylene glycol ethyl ether acetate, isopropyl alcohol and ethylene glycol monoethyl ether.

14. The process according to claim 13 wherein said poly(2-hydroxy ethyl methacrylate) comprises from 5% to 15% by weight, said poly(tri-n-butyltin methacrylate) comprises from 40% to 60% by weight, said poly(hexamethylene diisocyanate) comprises to 2% to 5% by weight, and said medium comprises 25% to 45% by weight.

15. The method of protecting a boat hull against fouling by organisms present in the surrounding water which comprises painting at that portion of the boat hull below the water line with a paint which is prepared as a single component composition by:
(a) comingling
  (i) poly(2-hydroxy ethyl methacrylate),
  (ii) poly(tri-n-butyltin methacrylate), and
  (iii) poly(hexamethylene diisocyanate),
(b) in the presence of a medium comprising methyl ethyl ketone, cyclohexanone, ethylene glycol ethyl ether acetate, isopropyl alcohol, and ethylene glycol mono ethyl ether.

16. Method according to claim 15 wherein said poly(2-hydroxy ethyl methacrylate) comprises from 5% to 15% by weight, said poly(tri-n-butyltin methacrylate) comprises from 40% to 60% by weight, said poly(hexamethylene diisocyanate) comprises 2% to 5% by weight, and said medium comprises 25% to 45% by weight.

17. A single component coating composition having optically clear film characteristics for preventing growth of fouling organisms on marine structure prepared by the method which comprises:
(a) comingling
  (i) 5% to 15% by weight poly(2-hydroxy ethyl methacrylate),
  (ii) 40% to 60% by weight poly(tri-n-butyltin methacrylate), and
  (iii) 2% to B 5% by weight poly(hexamethylene diisocyanate),
(b) in the presence of a medium comprising methyl ethyl ketone, cyclohexanone, ethylene glycol ethyl ether acetate, isopropyl alcohol, and ethylene glycol mono ethyl ether, said medium comprising 25% to 45% by weight of said composition, said medium comprising, by weight of total medium, 30% to 50% methyl ethyl ketone, 15% to 30% cyclohexanone, 15% to 30% ethylene glycol ether acetate, 5% to 15% isopropyl alcohol, and 5% to 15% ethylene glycol monoethyl ether.

18. The process of protecting marine structures against the growth of fouling organisms which comprises treating said structures with a hydrophobic polymeric film which is prepared as a single component composition by:
(a) comingling
  (i) 5% to 15% by weight poly(2-hydroxy ethyl methacrylate),
  (ii) 40% to 60% by weight poly(tri-n-buyltin methacrylate), and
  (iii) 2% to 5% by weight poly(hexamethylene diisocyanate),
(b) in the presence of a medium comprising methyl ethyl ketone, cyclohexanaone, ethylene glycol ethyl ether acetate, isopropyl alcohol, and ethylene glycol mono ethyl ether, said medium comprising 25% to 45% by weight of said composition, said medium comprising, by weight of total medium, 30% to 50% methyl ethyl ketone, 15% to 30% cyclohexanone, 15% to 30% ethylene glycol ether acetate, 5% to 15% isopropyl alcohol, and 5% to 15% ethylene glycol monoethyl ether.

19. The method of protecting a boat hull against fouling by organisms present in surrounding water which comprises painting that portion of said boat hull below the waterline with a paint prepared as a single component system by comingling
a hydroxy-functional acrylic polymer;
a biologically active organotin polymer of the formula

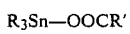

$R_3Sn-OOCR'$ wherein R is selected from the group consisting of lower alkyl, phenyl and benzyl and R' is a polymerizable radical selected from the group consisting of vinyl, methylvinyl and vinylphenyl;
a polyol reactive polyisocyanate; and
a reaction inhibiting solvent medium comprising a mixture of at least one low molecular weight ketone and a co-solvent selected from the group consisting of hydroxyethers, linear alcohols and isopropyl alcohol.

20. The method of protecting a boat hull against fouling by organisms present in the surrounding water which comprises painting at that portion of the boat hull below the water line with a paint which is prepared as a single component composition by:
(a) comingling
  (i) 5% to 15% by weight poly(2-hydroxy ethyl methacrylate),
  (ii) 40% to 60% by weight poly(tri-n-buyltin methacrylate), and
  (iii) 2% to 5% by weight poly(hexamethylene diisocyanate),
(b) in the presence of a medium comprising methyl ethyl ketone, cyclohexanone, ethylene glycol ethyl ether acetate, isopropyl alcohol, and ethylene glycol mono ethyl ether, said medium comprising 25% to 45% by weight of said composition, said medium comprising, by weight of total medium, 30% to 50% methyl ethyl ketone, 15% to 30% cyclohexanone, 15% to 30% ethylene glycol ether acetate, 5% to 15% isopropyl alcohol, and 5% to 15% ethylene glycol monoethyl ether.

* * * * *